(12) United States Patent
Pawlik et al.

(10) Patent No.: US 9,708,019 B2
(45) Date of Patent: Jul. 18, 2017

(54) TRACK-SUPPORTING ROLLER ASSEMBLY FOR A CRAWLER CHASSIS

(71) Applicant: JOSEPH VOEGELE AG, Ludwigshafen/Rhein (DE)

(72) Inventors: Christian Pawlik, Neustadt (DE); Martin Buschmann, Neustadt (DE); Ralf Weiser, Ladenburg (DE); Arthur Braun, Deidesheim (DE)

(73) Assignee: JOSEPH VOEGELE AG (DE)

( * ) Notice: Subject to any disclaimer, the term of this patent is extended or adjusted under 35 U.S.C. 154(b) by 0 days.

(21) Appl. No.: 14/249,742

(22) Filed: Apr. 10, 2014

(65) Prior Publication Data

US 2014/0305717 A1  Oct. 16, 2014

(30) Foreign Application Priority Data

Apr. 12, 2013  (EP) ..................................... 13001923

(51) Int. Cl.
*B62D 55/15* (2006.01)
*B62D 55/06* (2006.01)
*B62D 55/096* (2006.01)
*E01C 19/18* (2006.01)

(52) U.S. Cl.
CPC ......... *B62D 55/06* (2013.01); *B62D 55/0966* (2013.01); *B62D 55/15* (2013.01); *E01C 19/18* (2013.01)

(58) Field of Classification Search
CPC ................................................ B62D 55/0966
USPC .......... 180/9.1; 305/124, 119, 130; 29/895.2
See application file for complete search history.

(56) References Cited

U.S. PATENT DOCUMENTS

| 2,678,136 | A | * | 5/1954 | Metailler | ................ | B66C 23/78 |
| | | | | | | 212/253 |
| 2,678,138 | A | * | 5/1954 | Edwards | ................ | B29C 31/08 |
| | | | | | | 221/131 |
| 3,700,288 | A | | 10/1972 | Davin et al. | | |

(Continued)

FOREIGN PATENT DOCUMENTS

CN 100546865 C 10/2009
DE 2064454 A1 7/1971
(Continued)

OTHER PUBLICATIONS

Extended European Search Report Dated Apr. 4, 2014, Application No. 13001923.5-1760—Applicant Joseph Vögele AG, 12 Pages.

(Continued)

*Primary Examiner* — Jacob Knutson
(74) *Attorney, Agent, or Firm* — Brooks Kushman P.C.

(57) ABSTRACT

A track-supporting roller assembly, according to the disclosure, for supporting a crawler track of a crawler chassis includes a bearing unit and a track-supporting roller rotatably coupled to the bearing unit. The track-supporting roller includes at least one supporting body made of plastic. The supporting body serves as a damper and prevents a metal-on-metal contact between track chain links of the crawler track and the track-supporting roller. The track-supporting roller assembly according to the disclosure ensures a reduced noise development in the crawler chassis. At the same time, it is possible to also reduce the wear of the track-supporting rollers to a considerable extent.

18 Claims, 2 Drawing Sheets

(56) References Cited

U.S. PATENT DOCUMENTS

| | | | | |
|---|---|---|---|---|
| 4,890,892 A | * | 1/1990 | Haslett | B62D 55/145 |
| | | | | 295/11 |
| 5,009,546 A | * | 4/1991 | Domenighetti | B62D 55/02 |
| | | | | 404/110 |
| 5,803,558 A | * | 9/1998 | Ketting | B62D 55/088 |
| | | | | 305/119 |
| 7,488,138 B2 | * | 2/2009 | Buschmann | E01C 19/176 |
| | | | | 239/161 |
| 7,806,209 B2 | | 10/2010 | Standish et al. | |
| 7,954,575 B1 | * | 6/2011 | Bloxsom | H02G 1/088 |
| | | | | 104/138.1 |
| 2004/0084961 A1 | * | 5/2004 | Yamamoto | B62D 55/15 |
| | | | | 305/136 |
| 2005/0212358 A1 | * | 9/2005 | Yamamoto | B62D 55/15 |
| | | | | 305/124 |
| 2005/0253453 A1 | * | 11/2005 | Miller | B62D 55/0966 |
| | | | | 305/136 |
| 2006/0158034 A1 | * | 7/2006 | Standish | B62D 55/096 |
| | | | | 305/135 |
| 2009/0152037 A1 | | 6/2009 | Brazier | |
| 2010/0096196 A1 | | 4/2010 | VanderVeen | |
| 2013/0020860 A1 | | 1/2013 | Braun | |

FOREIGN PATENT DOCUMENTS

| | | | | |
|---|---|---|---|---|
| EP | 0759392 | A2 | 2/1997 | |
| EP | 1666345 | A2 | 6/2006 | |
| EP | 1798138 | A1 | 6/2007 | |
| EP | 2548789 | A1 | 1/2013 | |
| GB | 13796655 | A * | 2/1972 | |
| GB | 1379665 | A * | 1/1975 | B62D 55/0966 |
| JP | S63125704 | A | 5/1988 | |
| JP | H01134677 | A | 5/1989 | |
| JP | 10316061 | A | 2/1998 | |
| JP | 10316061 | A | 12/1998 | |

OTHER PUBLICATIONS

European Search Report Dated Oct. 2, 2013, Application No. EP 13 00 1923, 4 Pages.
European Search Report Dated Apr. 4, 2014, Application No. EP 13001923.5-1760 Applicant Joseph Vögele AG, 12 Pages.
Japanese Office Action Dated Feb. 3, 2015, Application No. 2014-038163, Dispatch No. 048295, Applicant Joseph Voegel AG, 2 Pages.
Japanese Office Action Dated Aug. 4, 2015, Application No. 2014-038163, Dispatch No. 351359, 3 Pages.
Chinese Office Action Dated Dec. 15, 2015, Application No. 201410146181.9, 7 Pages.
Japanese Office Action Dated Jan. 28, 2016, Application No. 2014-038163, 3 Pages.
Chinese Office Action Dated Aug. 2, 2016, Application No. 201410146181.9, 6 Pages.

* cited by examiner

TRACK-SUPPORTING ROLLER ASSEMBLY FOR A CRAWLER CHASSIS

CROSS-REFERENCE TO RELATED APPLICATIONS

This application claims foreign priority benefits under 35 U.S.C. §119(a)-(d) to European patent application number EP 13001923.5, filed Apr. 12, 2013, which is incorporated by reference in its entirety.

TECHNICAL FIELD

The present disclosure relates to a track-supporting roller assembly for supporting a crawler track of a crawler chassis.

BACKGROUND

Conventionally, track-supporting rollers made of steel are used to support the upper crawler section of a crawler track in a crawler chassis. The crawler track chain links roll directly on the steel rollers, which may lead to an undesired noise development at the workplace. In addition, it has shown that the metal-on-metal contact between the chain links and the steel rollers results in a greater wear not only of the steel rollers, but also of the chain links of the crawler track. Remedying such signs of wear is very expensive, and cannot be done right at the construction site, but has to be carried out in a workshop. Also, rust deposits may be formed between the steel rollers and the chain links if the construction machine with the crawler chassis remains outdoors on the construction site for a longer period. Above all, this may lead to split-offs on the steel roller surface when the construction machine starts moving, resulting in an unsteady and noisy run of the crawler track.

EP 1 666 345 B1 discloses a crawler chassis having a track-supporting roller assembly which is positioned next to a drive wheel. The track-supporting roller assembly comprises a supporting roller which is mounted on both sides and on which the crawler track rolls along. The supporting roller has an increased diameter at its outer ends, on which position the chain links are supported.

US 2010/0096196 A1 discloses another crawler chassis. The crawler chassis comprises several track-supporting rollers which are arranged on a carrier, respectively mounted on both sides, between a drive wheel and a return wheel. The supporting surface for the chain links is formed by outer portions of the respective track-supporting rollers that have an increased diameter. The respective track-supporting rollers are mounted in a lubricating bushing on both sides. It is difficult, however, to seal the lubricating bushing bearing in such a way that an escape of lubricant from the bearing during the operation is prevented, which could result in an unsteady run of the respective track-supporting rollers.

EP 1 798 138 B1 discloses a mounting structure for a track-supporting roller for a crawler track which is mounted on a lower frame of the crawler chassis. The mounting structure comprises a mounting part and a support part for the carrier roller. The support part comprises a clamping closure which can be screwed such that a shaft of the carrier roller can be mounted in the clamping closure, on which shaft the carrier roller is rotatably fixed. The drawback of this arrangement is that the screw closure can become loose when vibrations occur during the operation, so that the carrier roller may slip out of the support part.

SUMMARY

It is an object of the present disclosure to provide a track-supporting roller assembly by means of which a smooth and reliable guidance of the crawler track can be obtained, and which ensures at the same time that the extent of wear signs on the track-supporting roller and on the track chain links of the crawler track guided on the track-supporting roller is reduced.

This object is achieved by providing the track-supporting roller with at least one supporting body made of plastic. The supporting body made of plastic is provided on the track-supporting roller such that the track chain links of the crawler track roll along on the supporting body. The supporting body acts like a damper and, therefore, is able to buffer movements of the upper crawler section of the crawler track such that the noise development is reduced. The supporting body made of plastic is not only characterized by its excellent damping properties during the operation, but also provides for a certain protective function during a standstill of the crawler chassis. This protective function is noticeable, above all, because construction machines remaining outdoors on the construction site for a longer period are no longer subject to rust deposits between the track-supporting rollers and the track chain links. Thus, a gentle start of the crawler chassis is possible without creating split-offs on the track-supporting roller, respectively on the track chain links.

In a preferred embodiment of the disclosure the supporting body is made of polyurethane. Polyurethane is particularly characterized by a high resistance against climatic influences and, therefore, is extremely well suited for use on the construction site. In addition, polyurethane is pertinacious to abrasion and offers excellent adhesive properties, which is an advantage in particular for the guidance of the crawler track. A supporting body of polyurethane furthermore offers excellent damping properties, so that movements of the crawler track can be buffered well without stressing the bearing unit of the track-supporting roller assembly. Thus, a prolonged service life of the bearing unit can be expected. In order to realize a particularly abrasion-resistant support for a crawler track the supporting body is, in another embodiment of the disclosure, made of rubber, above all with a hardness grade of more than 90 shore.

In addition to the excellent abrasion resistance, a supporting body made of rubber also allows the excellent dampening of impact forces of the crawler track so as to prevent these forces from being transferred to the bearing unit of the track-supporting roller assembly.

Preferably, the supporting body has an outer diameter between 40 mm and 100 mm, specifically 50 mm. Thus, the track-supporting roller assembly is very compact. Such a track-supporting roller assembly allows guiding a crawler track at a small height relative to the ground. Guiding the crawler track at a small height is above all advantageous for road finishers as the installation space of the crawler chassis in an upward direction is limited by the material bunker.

According to another embodiment of the disclosure the supporting body is hollow-cylindrical and has an inner diameter between 20 mm and 60 mm. A supporting body with such dimensions is easy to manufacture and easy to couple to the track-supporting roller.

Preferably, the track-supporting roller comprises a shaft on which the supporting body is fixed. The shaft provides for a stable basis on which the supporting body can be mounted in a rotation-fixed manner. The shaft is advantageously made of a metal that has a high bending stiffness. As compared to the supporting body the shaft does not yield to the movement of the crawler track so that the bearing unit can be relieved.

It is particularly favorable if the supporting body is shrunk or cast onto the shaft. Thus, it is possible to fix the supporting body on the shaft in a rotation-fixed and anti-slip manner. This is an advantage because great forces act on the supporting body owing to the guiding, respectively carrying of the crawler track. Rotatability of the supporting body relative to the shaft is not desirable as the supporting body is thus heated up to a particularly great extent and could be damaged.

In another embodiment of the disclosure it is provided that the shaft comprises a stop against which the supporting body bears. Even in the case of great axial lateral forces the supporting body is thus secured against the stop and cannot slip out of place on the shaft.

Preferably, the stop has a smaller outer diameter than the supporting body. Thus, it can be prevented that the stop collides with chain links of the crawler track. This diameter difference relative to the supporting body also helps to achieve a form-fit contact of the crawler track chain links on the track-supporting roller, so that the crawler track can be guided positionally accurate and smoothly.

It is also an advantage if the stop has a greater outer diameter than the shaft on which the supporting body is arranged. Thus, the stop defines a particularly robust counter-bearing for the supporting body.

According to another embodiment of the disclosure the stop has a hollow-cylindrical shape, wherein its inner diameter substantially corresponds to the outer diameter of the shaft. Thus, the stop may be arranged concentrically on the shaft, resulting in a smooth guidance of the crawler track.

An excellent resistance against climatic influences is exhibited by the stop if it is made of plastic, especially of polyurethane. In case the stop, like the supporting body, is permanently in contact with chain links of the crawler track it can thus be prevented that rust deposits occur in the contact area to the chain links. Moreover, the stop, if made of plastic, acts as a protective envelope for the shaft of the track-supporting roller.

The stop may be fixed on the shaft in a particularly stable manner if it is shrunk or cast onto the shaft. This may be accomplished simultaneously with shrinking on, respectively casting on, the supporting body, or in a subsequent or preceding process.

Alternatively, the stop may also be formed integrally with the shaft, however, e.g., formed as a cast body or body of rotation of metal. In the appropriate case this would result in a greater stability of the track-supporting roller.

It is also conceivable that the supporting body encases, at least section-wise, the shaft and also the stop. Thus, the supporting body protects both the stop and the shaft. At the same time, the stop holds the supporting body on the shaft in a stable manner.

Preferably, the bearing unit comprises at least one bearing body which rotatably supports one end of the shaft. The bearing body can be easily fixed to the crawler chassis and ensures a regular rotation of the shaft.

The track-supporting roller assembly is particularly smooth in operation if the track-supporting roller is coupled to the bearing unit by a roller bearing. The roller bearing allows the support of great radial forces, which may take effect in particular in supporting and guiding a crawler track.

According to a particularly preferred embodiment of the disclosure the roller bearing is a self-aligning roller bearing. The self-aligning roller bearing has, above all, the advantage that it can be loaded to a great extent both axially and radially in both directions. In addition, the self-aligning roller bearing is capable of compensating misalignments or deflections of the track-supporting roller, respectively shaft.

Another improvement of the disclosure provides that the self-aligning roller bearing comprises an inner ring which bears against the supporting body. The inner ring thus provides a roller track for the self-aligning roller bearing and, at the same time, an attachment, respectively support, for the supporting body. This has the result that the supporting body is secured against the inner ring and can thus be fixed on the shaft in a stable manner.

Preferably, the self-aligning roller bearing comprises an outer ring which is arranged in the bearing unit. The bearing unit offers enough protection for the outer ring and forms a stable receptacle for same.

The self-aligning roller bearing may be coupled to the bearing unit in a particularly reliable manner by means of a clamping plate. Also, the clamping plate is able to prevent dirt and moisture from penetrating into the self-aligning roller bearing.

The subject matter of the present disclosure also is directed to a crawler chassis having at least one track-supporting roller assembly of the above-described type. The crawler chassis furthermore comprises a crawler track having an upper crawler section and a lower crawler section, wherein the upper crawler section rests on the track-supporting roller of the track-supporting roller assembly in a sagging manner. The sagging of the upper crawler section entails a reduced installation volume of the crawler chassis, which is an advantage in particular for road finishers. This will be described below by means of the figures.

The crawler chassis is suited particularly well for use in a road finisher if it is configured such that the crawler track can be guided by the track-supporting roller assembly such that an upper edge of the upper crawler section of the crawler track is positioned maximally 700 mm, in particular 650 mm, above a lower edge of the lower crawler section. As compared to other crawler chassis heights the height of the herein described crawler chassis is clearly smaller, so that it can be easily installed in a road finisher underneath a material bunker.

The subject matter of the present disclosure also is directed to a road finisher having a crawler chassis with at least one track-supporting roller assembly according to the disclosure of the above-described type. In this road finisher the upper edge of the upper crawler section is at least 50 mm away from a material bunker bottom. This distances is a dimension sufficient for the crawler track not to strike against the material bunker bottom. At the same time, it is possible to maintain a low filling height of the material bunker for the loading of the truck.

The subject matter of the disclosure is explained in more detail by means of the attached drawings.

DETAILED DESCRIPTION

Figure 1:
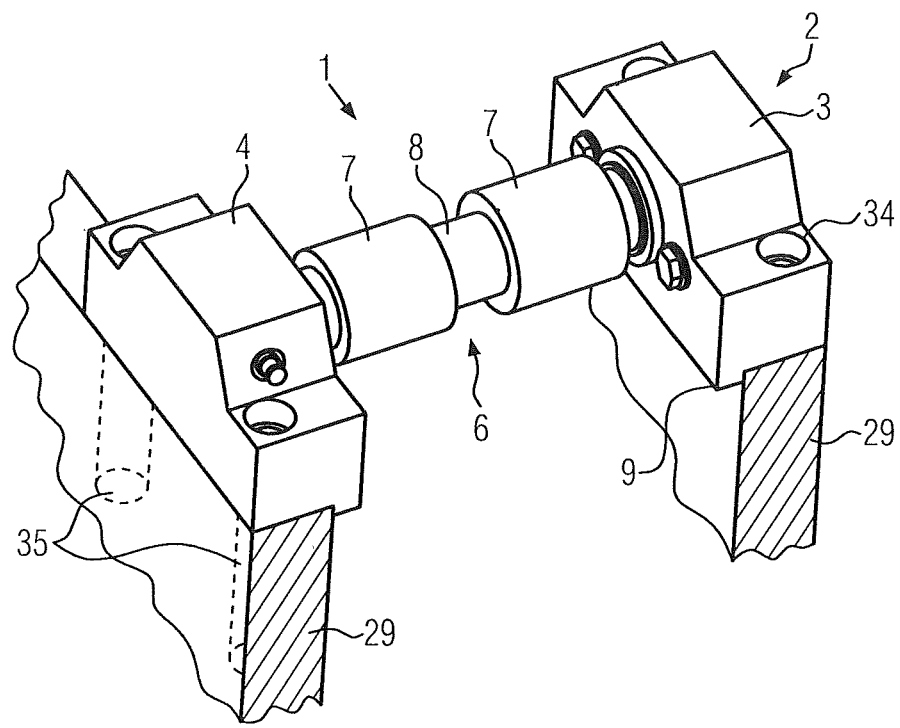
FIG. 1 shows a perspective view of a track-supporting roller assembly according to the disclosure.

FIG. 1 shows a track-supporting roller assembly 1 according to the disclosure. The track-supporting roller assembly 1 is characterized by a compact design and is excellently suited for supporting a crawler track of a road finisher, as will be described below in connection with FIG. 3.

The track-supporting roller assembly 1 comprises a bearing unit 2 which includes a first bearing body 3 and a second bearing body 4. The first and the second bearing bodies 3, 4 are identical in design. Two bore holes 34 are respectively provided on the bearing bodies 3, 4 and serve to fix the bearing bodies 3, 4.

A track-supporting roller 6 is arranged between the two bearing bodies 3, 4. The ends of the track-supporting roller 6 are rotatably received in the bearing bodies 3, 4.

According to FIG. 1, the track-supporting roller 6 comprises two supporting bodies 7 which are arranged coaxially side by side and spaced apart by a stop 8. The two supporting bodies 7 have the same outer diameter A7, which is greater than the outer diameter A8 of the stop 8 arranged there between. Furthermore, as explained above, the supporting bodies 7 may be made of plastic.

Figure 3:
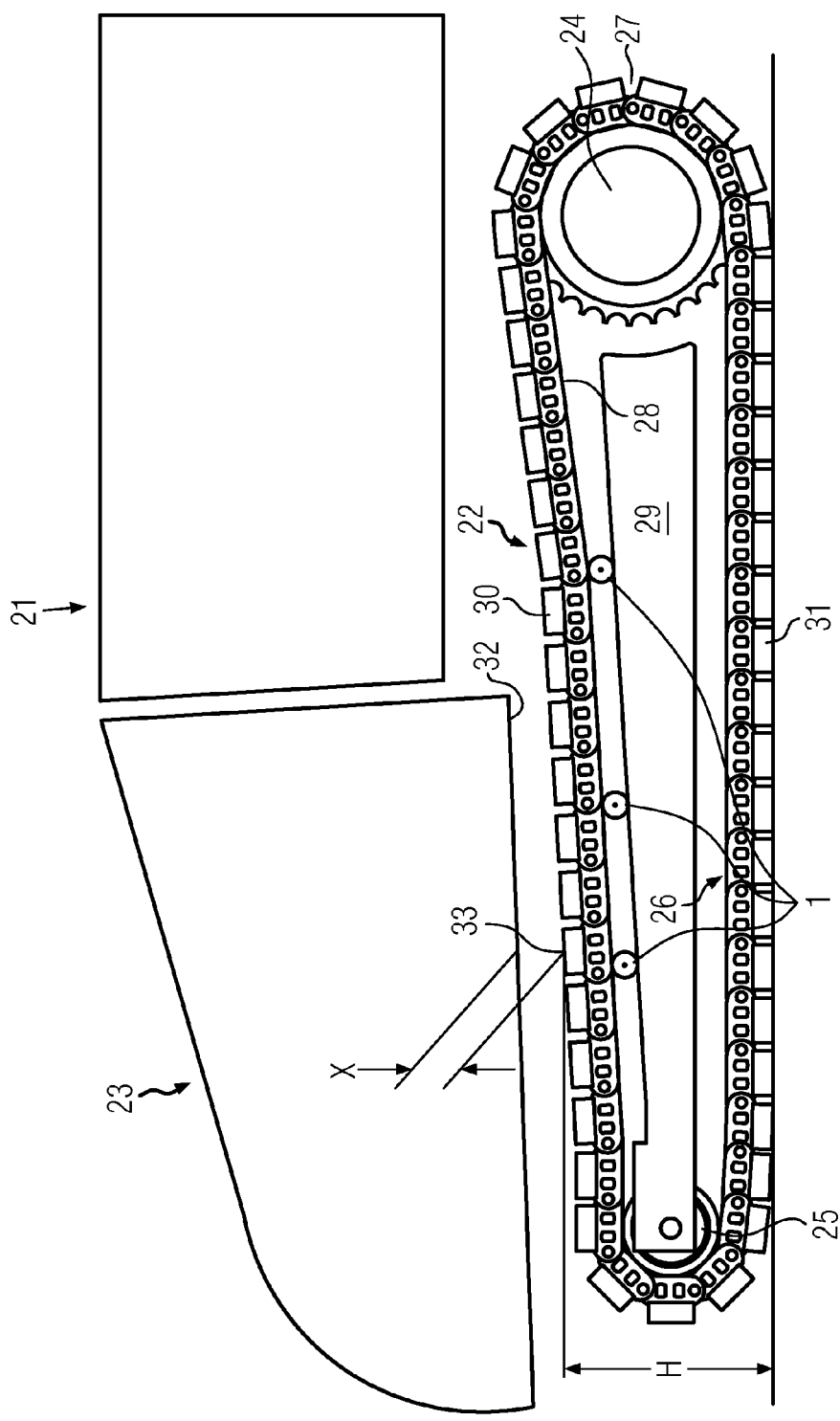
FIG. 3 shows a road finisher comprising a crawler chassis and track-supporting roller assemblies according to the disclosure installed therein.

FIG. 1 furthermore shows an impact shoulder 9 respectively formed on the bottom of the bearing bodies 3, 4, which acts as an abutment for fixing the bearing bodies 3, 4. The impact shoulder 9 of the bearing bodies 3, 4 has the purpose to rest against the carrier 29 of the crawler chassis 22 as shown in FIGS. 1 and 3 in a form-fit manner so as to ensure a form-fit construction of the track-supporting roller assembly 1 relative to the carrier 29. This particularly has the advantage that the track-supporting roller assembly 1 can be held safely on the carrier 29, without slipping out of place, despite impact forces acting on the crawler track 26 (see FIG. 3). Thus, in particular the impact shoulders 9 of the bearing bodies 3, 4 achieve a particularly stable support of the track-supporting roller assembly 1 on the carrier 29. FIG. 1 furthermore shows that two vertical bore holes 34 are respectively provided in the bearing bodies 3, 4. The vertical bore holes 34 may be oriented on the carrier to be aligned with threaded holes 35 provided in the carrier 29. Thus, it is possible to screw the track-supporting roller assembly 1 to the carrier 29 by non-illustrated fixing screws.

Figure 2:
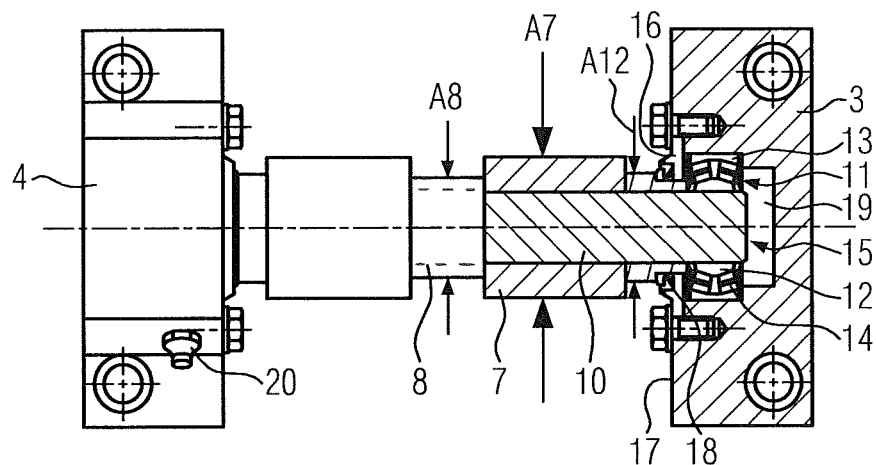
FIG. 2 shows a top view of the track-supporting roller assembly of FIG. 1, including a partial sectional view.

FIG. 2 shows a top view of the track-supporting roller assembly 1 according to the disclosure, including a sectional view of the portion on the right.

It can be easily seen in FIG. 2 that the track-supporting roller 6 furthermore comprises a shaft 10 on which the supporting bodies 7 are arranged. The portion of the track-supporting roller assembly 1 shown in the sectional view will now be described in detail. This description equally applies to the other half of the track-supporting roller assembly 1 which is not shown in a sectional view in FIG. 2.

In FIG. 2, the bearing body 7 is hollow-cylindrical and abuts against the stop 8 on the side pointing away from the bearing body 3. The stop 8 has a greater outer diameter A8 than the shaft 10 and a smaller outer diameter A8 than the hollow-cylindrical supporting body 7. The supporting body 7 preferably has an outer diameter A7 of 50 mm.

The shaft 10 is coupled to the bearing body 3 by means of a roller bearing R, which is configured as a self-aligning roller bearing 11 in FIG. 2. The self-aligning roller bearing 11 comprises an inner ring 12 and an outer ring 13 and defines there between a roller bearing track for rollers 14. A receptacle 15 is formed in the bearing body 3, in which the outer ring 13 of the self-aligning roller bearing 11 in completely received.

The inner ring 12 is axially broader than the outer ring 13. The inner ring 12 protrudes into the receptacle 15 of the bearing body 3 and extends substantially up to one end of the shaft 10. The roller bearing track with rollers 14 is completely received in the receptacle 15. The inner ring 12 protrudes out of the receptacle 15 and extends up to the supporting body 7. Thus, the inner ring 12 can prevent the supporting body 7 on shaft 10 from slipping outwardly. The supporting body 7 is thus enclosed between the stop 8 and the inner ring 12 of the self-aligning roller bearing 11, so that the supporting body 7 cannot be displaced in the axial direction along the shaft 10. In the area where the supporting body 7 bears against the inner ring 12 the inner ring 12 may have a greater outer diameter A12 which substantially corresponds to the outer diameter A8 of the stop 8. The inner ring 12 is preferably shrunk onto the shaft 10, but may also be fixed to same by other fixing means.

The self-aligning roller bearing 11 is held in the receptacle 15 by means of a clamping plate 16. The clamping plate 16 is annular and screwed against an end face 17 of the bearing body 3. The clamping plate 16 presses the outer ring 13 of the self-aligning roller bearing 11 positionally fixed into the receptacle 15 so that the outer ring 13 is unable to move in the receptacle. Also, sealing means, e.g., a sealing lip 18, may be provided on the clamping plate 16, which allow a rotation of the inner ring 12 relative to the clamping plate 16, but prevent, at the same time, that dirt, respectively moisture, penetrates into the receptacle 15.

The receptacle 15 comprises a storage or storage area 19. The storage 19 may receive a lubricating grease or lubricating oil. The lubricating grease or lubricating oil may be supplied to the storage 19 through an inlet screw 20. The inlet screw 20 is shown in FIG. 2, on the other bearing body 4.

FIG. 3 shows a road finisher 21 having a crawler chassis 22 and a material bunker 23. The material bunker 23 is arranged above a front portion of the crawler chassis 22. The crawler chassis 22 comprises a drive wheel 24 and a return wheel 25. A crawler track 26 is tightened around the drive wheel 24 and the return wheel 25. The crawler track 26 comprises a profile 27 as well as numerous track chain links 28 arranged one behind the other. The crawler chassis 22 further includes a carrier 29 by means of which the crawler chassis 22 is fixed to the road finisher 21.

FIG. 3 shows in a schematic view that three track-supporting roller assemblies 1 are arranged on the carrier 29 side by side. The crawler track 22 comprises an upper crawler section 30 which sags downwardly and is supported by means of the track chain links 28 on the three track-supporting roller assemblies 1 which are arranged side by side. The crawler track 26 also comprises a lower crawler section 31 which runs on the ground.

The material bunker 23 has a material bunker bottom 32 which is arranged above a front portion of the upper crawler section 30. The material bunker bottom 32 is arranged above the upper crawler section 30 by a distance X. An upper edge 33 of the upper crawler section 30 is positioned, at least along the material bunker bottom 32, at a medium height H, which preferably is 650 mm. Guiding the upper crawler section 30 underneath the material bunker bottom 32 at such a height can be achieved by the compact design of the track-supporting roller assembly. The height H added to distance X results in maximum of 1000 mm. Thus, it is possible to position the material bunker 23 at a preferred loading height above the crawler chassis 22.

While exemplary embodiments are described above, it is not intended that these embodiments describe all possible forms of the invention. Rather, the words used in the specification are words of description rather than limitation, and it is understood that various changes may be made without departing from the spirit and scope of the invention.

Additionally, the features of various implementing embodiments may be combined to form further embodiments of the invention.

What is claimed is:

1. A track-supporting roller assembly for supporting a crawler track of a crawler chassis, the track-supporting roller assembly comprising:
   a bearing unit including at least one bearing body; and
   a track-supporting roller rotatably coupled to the bearing unit, wherein the track-supporting roller comprises a shaft having one end rotatably supported by the at least one bearing body, first and second supporting bodies fixed on the shaft in a rotationally-fixed manner and arranged coaxially side by side for contacting and carrying the crawler track, and a stop that spaces the supporting bodies apart, wherein each supporting body has an outer diameter that is greater than an outer diameter of the stop, and the outer diameters of the supporting bodies are the same, and wherein the supporting bodies are made of plastic to reduce noise and wear associated with the track-supporting roller.

2. The track-supporting roller assembly according to claim 1 wherein the supporting bodies comprise polyurethane.

3. The track-supporting roller assembly according to claim 1 wherein the supporting bodies comprise rubber.

4. The track-supporting roller assembly according to claim 1 wherein the outer diameter of each of the supporting bodies is between 40 mm and 100 mm.

5. The track-supporting roller assembly according to claim 1 wherein the supporting bodies are shrunk or cast onto the shaft.

6. The track-supporting roller assembly according to claim 1 wherein the supporting bodies bear against the stop.

7. The track-supporting roller assembly according to claim 1 wherein the bearing unit comprises a roller bearing that couples the track-supporting roller to the at least one bearing body.

8. The track-supporting roller assembly according to claim 7 wherein the roller bearing is a self-aligning roller bearing.

9. The track-supporting roller assembly according to claim 8 wherein the self-aligning roller bearing comprises an inner ring which bears against one of the supporting bodies.

10. The track-supporting roller assembly according to claim 9 wherein the self-aligning roller bearing comprises an outer ring which is arranged in the bearing unit.

11. The track-supporting roller assembly according to claim 8 wherein the self-aligning roller bearing is coupled to the bearing unit by a clamping plate.

12. A crawler chassis comprising a track-supporting roller assembly according to claim 1, and a crawler track having an upper crawler section and a lower crawler section, wherein the upper crawler section rests on the track-supporting roller of the track-supporting roller assembly in a sagging manner.

13. The crawler chassis according to claim 12 wherein the crawler chassis is configured such that the crawler track can be guided by the track-supporting roller assembly such that an upper edge of the upper crawler section of the crawler track is positioned maximally 700 mm above a lower edge of the lower crawler section.

14. A road finisher comprising a crawler chassis according to claim 12 wherein an upper edge of the upper crawler section is spaced at least 50 mm away from a material bunker bottom.

15. The track-supporting roller assembly according to claim 1 wherein the stop has an inner diameter that corresponds to an outer diameter of the shaft.

16. A road finisher comprising:
   a material bunker; and
   a crawler chassis including a drive wheel, a crawler track associated with the drive wheel and a track-supporting roller assembly for supporting the crawler track, the crawler track including an upper crawler section and a lower crawler section, the track-supporting roller assembly including a bearing unit and a track-supporting roller rotatably coupled to the bearing unit, wherein the bearing unit includes at least one bearing body, the track-supporting roller comprises a shaft having one end rotatably supported by the at least one bearing body, first and second supporting bodies fixed on the shaft in a rotationally-fixed manner and arranged coaxially side by side and configured to contact and support the crawler track, and a stop between the supporting bodies that spaces the supporting bodies apart, wherein each supporting body has an outer diameter that is greater than an outer diameter of the stop, and the outer diameters of the supporting bodies are the same, and wherein the supporting bodies are made of plastic to reduce noise and wear associated with the track-supporting roller, the upper crawler section rests on the track-supporting roller in a sagging manner, and an upper edge of the upper crawler section is spaced at least 50 millimeters away from a bottom of the material bunker.

17. The road finisher of claim 16 wherein the track-supporting roller further comprises a shaft on which the supporting bodies are fixed, and wherein the supporting bodies are shrunk or cast onto the shaft.

18. The road finisher of claim 16 wherein an upper edge of the upper crawler section is positioned maximally 700 millimeters above a lower edge of the lower crawler section.

* * * * *